US009189252B2

(12) United States Patent
Chu et al.

(10) Patent No.: US 9,189,252 B2
(45) Date of Patent: Nov. 17, 2015

(54) CONTEXT-BASED DEVICE ACTION PREDICTION

(75) Inventors: David Chu, Bellevue, WA (US); Aman Kansal, Issaquah, WA (US); Jie Liu, Medina, WA (US); Tingxin Yan, Amherst, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 427 days.

(21) Appl. No.: 13/340,702

(22) Filed: Dec. 30, 2011

(65) Prior Publication Data

US 2013/0173513 A1 Jul. 4, 2013

(51) Int. Cl.
*G06F 15/18* (2006.01)
*G06F 9/46* (2006.01)
*G06F 9/44* (2006.01)
*G06F 9/445* (2006.01)
*G06N 99/00* (2010.01)

(52) U.S. Cl.
CPC .............. *G06F 9/4443* (2013.01); *G06F 9/445* (2013.01); *G06N 99/005* (2013.01)

(58) Field of Classification Search
CPC ......... G06F 9/4443; G06F 15/18; G06F 9/46; G06F 1/163; G06F 3/011; G06F 3/016; G06F 21/00; G06F 17/30017
USPC ............................................ 706/14; 718/100
See application file for complete search history.

(56) References Cited

U.S. PATENT DOCUMENTS

| 6,067,565 | A | 5/2000 | Horvitz |
| 6,085,226 | A | 7/2000 | Horvitz |
| 6,182,133 | B1 | 1/2001 | Horvitz |
| 6,513,046 | B1 | 1/2003 | Abbott, III et al. |
| 8,112,755 | B2 | 2/2012 | Apacible et al. |
| 8,626,136 | B2 | 1/2014 | Ozzie et al. |
| 2004/0193813 | A1 | 9/2004 | Nguyen et al. |
| 2006/0155664 | A1 | 7/2006 | Morikawa et al. |
| 2006/0277271 | A1* | 12/2006 | Morse et al. .................. 709/217 |
| 2008/0005695 | A1* | 1/2008 | Ozzie et al. ................... 715/811 |
| 2008/0249969 | A1* | 10/2008 | Tsui et al. ....................... 706/46 |
| 2009/0036102 | A1* | 2/2009 | Ho ............................. 455/412.2 |
| 2009/0224867 | A1* | 9/2009 | O'Shaughnessy et al. .... 340/5.1 |

(Continued)

OTHER PUBLICATIONS

Boytsov A. et al., "Chapter 3 Context Prediction in Pervasive Computing Systems: Achievements and Challenges", Annals of Information Systems 13, 2011, pp. 35-63.*

(Continued)

*Primary Examiner* — Jeffrey A Gaffin
*Assistant Examiner* — David Misir
(74) *Attorney, Agent, or Firm* — Sandy Swain; Judy Yee; Micky Minhas

(57) ABSTRACT

The described implementations relate to automatically performing device actions. One implementation can obtain a contextual value of a contextor. The implementation can decide, using a decision engine, whether to perform an action on a computing device based on the contextual value. In an instance when the decision engine decides that the action is to be performed, the implementation can perform the action on the computing device. The implementation can also update the decision engine using feedback related to the action. As a specific example, the action can be prelaunching an application before a user has requested to execute the application. Prelaunching the application can reduce application latency relative to waiting for the user to request to execute the application before launching the application.

15 Claims, 7 Drawing Sheets

(56) References Cited

U.S. PATENT DOCUMENTS

| | | | |
|---|---|---|---|
| 2010/0112955 | A1 | 5/2010 | Krishnaswamy et al. |
| 2011/0014933 | A1 | 1/2011 | Karmarkar et al. |
| 2011/0028138 | A1 | 2/2011 | Davies-Moore et al. |
| 2011/0078758 | A1* | 3/2011 | Kohlenberg et al. ............... 726/1 |
| 2011/0320518 | A1* | 12/2011 | Tsui et al. ...................... 709/202 |

OTHER PUBLICATIONS

Gob A. et al., "Reducing User Perceived Latency with a Middleware for Mobile SOA Access", 2009 IEEE International Conference on Web Services, 2009, pp. 366-373.*

Schreiber D. et al., "Reducing User Perceived Latency in Mobile Processes", 2010 IEEE International Conference on Web Services, 2010, pp. 235-242.*

Makkar P. et al., "A Novel Approach for Predicting User Behavior for Improving Web Performance", International Journal on Computer Science and Engineering, vol. 02, No. 04, 2010, pp. 1233-1236.*

Schreiber D. et al., "Reducing User Perceived Latency with a Proactive Prefetching Middleware for Mobile SOA Access", International Journal of Web Services Research, 8(1), pp. 68-85, Jan.-Mar. 2011.*

Yan T. et al., "Fast App Launching for Mobile Devices Using Predictive User Context", MobiSys'12, Jun. 25-29, 2012, Low Wood Bay, Lake District, UK.*

"International Search Report", Mailed Date: May 31, 2013, Application No. PCT/US2012/070431, Filed Date: Dec. 19, 2012, pp. 10.

Natili, Giorgio, "Web caching and Web prefetching", Retrieved at <<http://www.mobilerevamp.org/2011/08/22/web-caching-and-web-prefetching/>>, Aug. 22, 2011, pp. 5.

Schreiber, et al., "Reducing User Perceived Latency with a Proactive Prefetching Middleware for Mobile SOA Access", Retrieved at <<http://www.irma-international.org/viewtitle/50493/>>, International Journal of Web Services Research, vol. 8, No. 1, Jan.-Mar. 2011, pp. 68-85.

Aleksy, et al., "Techniques for Efficient Resource Management for Context-Sensitive Mobile Applications", Retrieved at <<http://ieeexplore.ieee.org/stamp/stamp.jsp?tp=&arnumber=4606684>>, International Conference on Complex, Intelligent and Software Intensive Systems (CISIS), Mar. 4-7, 2008, pp. 211-216.

Balasubramanian, et al., "Energy Consumption in Mobile Phones: A Measurement Study and Implications for Network Applications", Retrieved at <<http://www.cs.umass.edu/~arunab/paper/tailender-imc09.pdf>>, Proceedings of the 9th ACM SIGCOMM conference on Internet measurement conference (IMC), Nov. 4-6, 2009, pp. 280-293.

Ravi, et al., "Context-aware Battery Management for Mobile Phones", Retrieved at <<http://www.cs.rutgers.edu/discolab/smartphone/papers/percom08.pdf, Proceedings of the Sixth Annual IEEE International Conference on Pervasive Computing and Communications (PERCOM), 2008, pp. 1-10.

Domingos, et al.; "Mining High-Speed Data Streams"; KDD '00; Proceedings of the Sixth ACM SIGKDD International Conference on Knowledge Discovery and Data Mining; 2000; Boston, MA; ACM Press; pp. 71-80.

Office Action Mailed May 6, 2015 from China Patent Application No. CN 201210592889.8 Filed Dec. 31, 2012 by Applicant Microsoft Corporation, 14 pages.

International Preliminary Report on Patentability and Written Opinion of the ISA Mailed Jul. 10, 2014 from PCT Patent Application No. PCT/US2012/070431 Filed Dec. 19, 2012 by Applicant Microsoft Corporation, 7 pages.

Examination Report Mailed May 13, 2015 from EP Patent Application No. EP 12863619.8 Filed Dec. 19, 2012 by Applicant Microsoft Corporation, 5 pages.

"Supplementary European Search Report," Mailed May 4, 2015, From European Application No. 12863619.8, 4 pages.

Bohmer et al., "Falling Asleep with Angry Birds, Facebook and Kindle—A Large Scale Study on Mobile Application Usage," In Proceedings of the 13th International Conference on Human Computer Interaction with Mobile Devices and Services, Aug. 11, 2011, 10 Pages.

Chu et al., "Mobile Apps: It's Time to Move up to CondOS," In Proceedings of the 13th USENIX Conference on Hot Topics in Operating Systems, Apr. 15, 2011, 5 Pages.

Kamisaka et al., "Operation Prediction for Context-Aware User Interfaces of Mobile Phones," In Proceedings of the Ninth Annual International Symposium on Applications and the Internet 2009, Jul. 20, 2009, pp. 16-22.

"Apple—Batteries—iPhone;" Online at www.apple.com/batteries/iphone.html, Dec. 29, 2011, 2 pages.

"Daily tip: How to make your iphone camera launch instantly [jailbreak];" Online at tipb.com/2011/04/20/daily-tip-iphone-camera-launch-instantly-jailbreak/, Apr. 20, 2011, 4 pages.

"ios 5 slowing iphone 4 and 4s complaints;" Online at www.phonesreview.co.uk/2011/10/25/ios-5-slowing-iphone-4-and-4s-complaints/, Oct. 10, 2011, 2 pages.

"Link prefetching FAQ;" Online at developer.mozilla.org/en/link_prefetching_faq; Mar. 3, 2003, 5 pages.

"Tasker," Online at http://tasker.dinglisch.net/; Dec. 29, 2010, 3 pages.

C. C. Aggarwal, J. L. Wolf, and P. S. Yu; "Caching on the world wide web;" IEEE Trans. Knowl. Data Eng., vol. 11, No. 1, Jan./Feb. 1999, 14 pages.

D. Garlan, D. P. Siewiorek, and P. Steenkiste; "Project aura: Toward distraction-free pervasive computing," IEEE Pervasive Computing, vol. 1, Apr.-Jun. 2002, pp. 22-31.

Y. Joo, J. Ryu, S. Park, and K. G. Shin; "Fast: Quick application launch on solid-state drives," in FAST, 2011, pp. 259-272.

D. Lymberopoulos, O. Riva, K. Strauss, A. Mittal, and A. Ntoulas; "PocketWeb: Instant web browsing for mobile devices," in ASPLOS'12, Mar. 3-7, 2012, 12 pages.

H. J. Miller and J. Han, "Geographic Data Mining and Knowledge Discovery;" Handbook of Geographic Information Science, Taylor & Francis, Inc., 2009.

F. Qian, Z. Wang, A. Gerber, Z. M. Mao, S. Sen, and O. Spatscheck; "Profiling resource usage for mobile applications: a cross-layer approach," in MobiSys'11, Jun. 28-Jul. 1, 2011, pp. 321-334.

M. Satyanarayanan, "Pervasive computing: Vision and challenges," IEEE Personal Communications, Aug. 2001, pp. 10-17.

C. Shepard, A. Rahmati, C. Tossell, L. Zhong, and P. Kortum; "Livelab: measuring wireless networks and smartphone users in the field," SIGMETRICS Performance Evaluation Review, vol. 38, Issue 3, Jan. 3, 2011, pp. 15-20.

Y. Zhu and D. Shasha, "Efficient elastic burst detection in data streams," In KDD '03, Proceedings of the Ninth ACM SIGKDD International Conference on Knowledge Discovery and Data Mining, Aug. 24, 2003, pp. 336-345.

Response filed Sep. 21, 2015 to the First Office Action from China Patent Application No. 201210592889.8, 11 pages.

Response Filed Aug. 19, 2015 to the First Examination Report Mailed May 13, 2015 From European Patent Application No. 12863619.8, 16 pages.

* cited by examiner

GUI 300
SELECT CONTEXTORS TO ENABLE

| CONTEXTOR | ENABLE 301 |
|---|---|
| TIME 211 | X |
| LOCATION 212 | X |
| PHONE LOG 213 | |
| AMBIENT NOISE 214 | |
| AMBIENT LIGHT 215 | |
| APP USAGE 216 | |

FIG. 3A

GUI 350
SELECT ACTIONS TO ENABLE

| ACTION | ENABLE 351 |
|---|---|
| PRELAUNCH APP 231 | X |
| EMAIL 352 | |
| SOCIAL NETWORKING 353 | X |
| ADJUST RING VOLUME 232 | X |
| ADJUST SCREEN BRIGHTNESS 233 | |

| RULE | ACTION | TIME 211 | PHONE LOG 213 | ... |
|---|---|---|---|---|
| 401 | Adjust Ring Volume 232 | 8:00 AM | | |
| 402 | Prelaunch Social Networking App 353 | | Bob | |

| RULE | ACTION | TIME 211 | PHONE LOG 213 | ... |
|---|---|---|---|---|
| 401 | Adjust Ring Volume 232 | 8:00 AM | | |
| 402 | Prelaunch Social Networking App 353 | | Bob | |
| 403 | Prelaunch Email App 352 | 9:00 AM | | |

| RULE | ACTION | TIME 211 | PHONE LOG 213 | AMBIENT NOISE 214 |
|---|---|---|---|---|
| 401 | Adjust Ring Volume 232 | 8:00 AM | | > 50 dB |
| 402 | Prelaunch Social Networking App 353 | | Bob | |
| 403 | Prelaunch Email App 352 | 9:00 AM | | |

400

CONTEXT-BASED DEVICE ACTION PREDICTION

BACKGROUND

Application software can vary in responsiveness to user inputs depending on numerous factors, including whether the application is relatively resource-intensive and whether available hardware resources of the device running the application are sufficient to meet the resource demands of the application. For example, startup latency for some mobile device applications is relatively long, on the order of 10-15 seconds. This problem is particularly acute when older hardware is used to execute newer applications, because newer applications tend to demand more resources than older applications.

One general approach to reducing application startup latency is to load applications in memory or even begin executing the applications before users actually invoke the applications. However, mobile devices tend to be relatively resource-constrained, and it is not always acceptable to allocate memory or processor resources to applications that are not currently in use. Indeed, in some cases, this approach can unnecessarily drain battery power by loading unnecessary data and/or executing unnecessary instructions.

SUMMARY

The described implementations relate to automatically performing device actions. One implementation is manifested as a technique that can include obtaining one or more contextual value values from one or more contextors. The technique can include deciding, using a decision engine comprising one or more decision rules, whether to perform an action on a computing device based on the one or more contextual values and the one or more decision rules. The technique can also include performing the action on the computing device in an instance when the decision engine decides that the action is to be performed. The technique can also include updating the decision rules of the decision engine using feedback related to the action.

Another implementation is manifested as a technique that can include identifying an application to prelaunch based on one or more contextual values. The technique can also include prelaunching the application to place the application into a prelaunched state and receiving feedback relating to the prelaunching.

Another implementation is manifested as a system that can include a context-based action module and a computing device. The computing device can be configured to execute the context-based action module. The context-based action module can be configured to, in a first instance: obtain a contextual value of a contextor, use a decision engine to decide not to perform an action on a computing device based on the contextual value, and not perform the action on the computing device. The context-based action module can also be configured to provide feedback related to the action to the decision engine, and the decision engine can be updated to learn to perform the action when the contextor has the contextual value. The context-based action module can also be configured to, in a second instance that is subsequent to the first instance: obtain the same contextual value of the contextor that was obtained in the first instance, use the updated decision engine to decide to perform the action on the computing device based on the same contextual value, and perform the action on the computing device.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

FIGS. 3A and 3B show exemplary graphical user interfaces in accordance with some implementations of the present concepts.

FIGS. 4A, 4B, and 4C show exemplary decision rules in accordance with some implementations of the present concepts.

DETAILED DESCRIPTION

Overview

Figure 1:
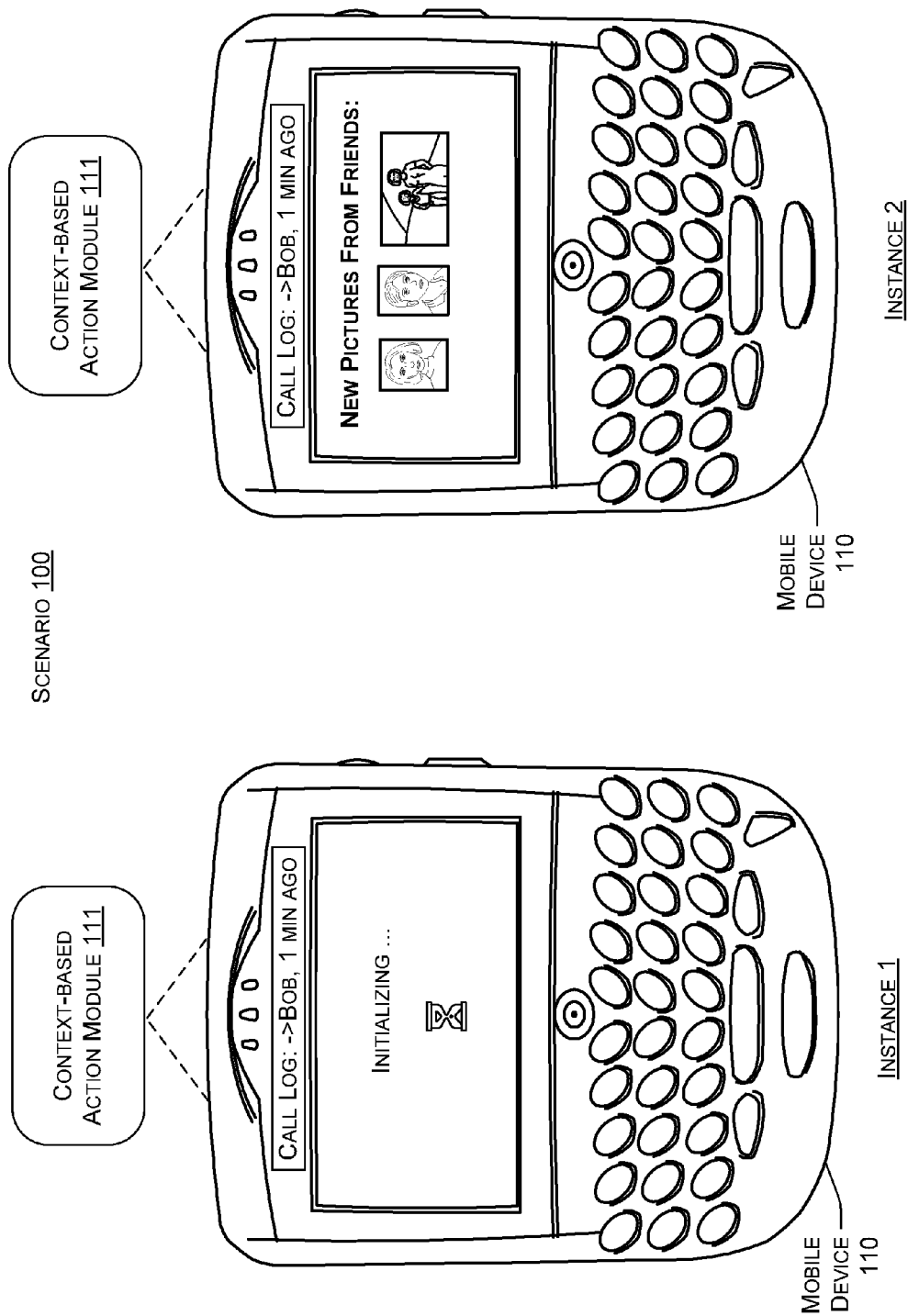
FIG. 1 shows an exemplary scenario in which some implementations of the present concepts can be employed.

This discussion relates to causing a device to automatically take various actions based on information that is available to a decision engine for the device. For example, in some implementations, a particular application is launched before a user has actually requested to execute the application. In some cases, launching an application before the user requests to execute the application can reduce application startup latency and provide a more satisfactory user experience. Certain examples provided herein are discussed with respect to a mobile device, because mobile devices tend to be relatively resource-constrained and the disclosed implementations may be particularly suited to implementation on resource-constrained devices. However, the disclosed implementations can also be performed on other types of computing devices such as laptops, servers, etc.

Generally, a user may request to execute an application by identifying and selecting an icon, tile, or other interface element representing the application using, e.g., a mouse, scroll wheel, touchscreen, or other input method. The icon can be selected from a desktop, menu, or other interface. For the purposes of this document, the term "launching" is a general term that includes various actions that typically occur responsive to receiving such a user request to execute an application. For example, launching can include allocating memory for the application and loading the application from storage into the allocated memory. Launching can also include executing the loaded application code to perform functions that may be related to application initialization. For example, application code that retrieves data such as web pages, images, video, etc. from a network can be executed as part of the launching. Processor resources such as threads and/or processes can also be allocated as part of launching the application.

Architecturally, the disclosed techniques can be implemented by using a decision engine that maps values of one or more "contextors" to different actions. Generally speaking, a contextor provides state information that can be used by the decision engine to determine whether to take a particular action, such as a launching an application. For example, some contextors have values obtained directly from, or logically derived from, one or more physical sensors on a mobile device, such as an accelerometer, light sensor, global positioning system ("GPS"), microphone, clock, etc. Other contextors can reflect activity by the user, such as requesting a certain application, calling a certain family member, sending a text message with a particular word, etc.

For the purposes of this document, the term "contextor" is generally used to indicate a source of information available to the device, e.g., from a sensor, operating system, individual application, etc. The term "contextual value" is used to refer to a value of an individual contextor and can include either direct values (e.g., ambient temperature) or logically derived values (e.g., by converting the temperature to terms such as cool, warm, etc.). Generally, the decision engine can learn which actions to take for current or historical contextual values (including sequences) of one or more contextors. Feedback can be provided implicitly or explicitly by the various actions to refine the decision engine and thereby learn particular contextual values for particular contextors that are then used to trigger particular actions. Note that the decision engine can learn both from instances where the decision engine decides to take a particular action automatically for the user, or from instances where the user took the action directly, i.e., without involvement of the decision engine.

Generally speaking, current or historical contextual values can be used to train an individual decision engine and to determine whether to take a particular action. Unless specifically indicated otherwise, the term "contextual value" as used herein can refer to either a current value or a historical value for a particular contextor. In some implementations, contextor logs are used to store a history of contextual values over time. Furthermore, in some cases, particular sequences of contextual values can also be obtained from the contextor logs and applied by the individual decision engine. One example of a sequence of contextual values could be an application usage pattern, e.g., a user may consistently use three different applications in a particular sequence.

One example of an action is the aforementioned launching of an application. The term "prelaunch" is used herein to refer to at least partially launching an application before a user actually requests to invoke the application by providing some type of device input. For example, the user may frequently open a social networking application shortly after ending phone calls with a particular contact, e.g., to check that person's social networking profile for status updates, pictures, comments, etc. The decision engine can learn to prelaunch the social networking application before the user actually requests to execute the application, e.g., during the phone call or shortly after the user ends the phone call. By proactively prelaunching the social networking application for the user, the user may experience relatively less latency when invoking the social networking application once the decision engine has learned to do the prelaunching under appropriate circumstances. In this case, a phone log contextor can provide contextual values indicating various contacts the user has spoken with on the phone. In some implementations, other information related to the call is also provided by the phone log contextor, e.g., time/day/date when the call took place, whether Bob called the user or the user called Bob, whether Bob and/or the user called from a work number or a personal number, etc.

Another example of an action is automatically adjusting the ringtone volume of a device. Consider a user that frequently increases the volume of their ringtone at times when the ambient noise detected by the microphone is relatively high. The decision engine can learn to take an action (increasing ringtone volume) when the value of the ambient noise contextor detected by the microphone is above a certain threshold. This ambient noise threshold can be learned by the decision engine as a particular contextual value that triggers the action. Said differently, the decision engine can predictively cause the ringtone volume to increase without user input in circumstances where a contextual value provided by the ambient noise contextor indicates that increasing the ringtone volume is an appropriate action for the decision engine to take. Over time, the decision engine can learn (1) to take the action of increasing the ringtone volume under high ambient noise circumstances, (2) refine the amount of ambient noise that triggers the decision engine to take this action, and (3) adjust the particular volume level higher or lower, e.g., responsive to different levels of ambient noise and/or user preference.

As mentioned above, the decision engine can be trained via feedback that indicates whether a particular action was appropriate. Thus, the decision engine can receive feedback after taking a given action and then use the feedback to refine the decision engine. Consider the example set forth above where the decision engine increases the ringtone volume. If the user subsequently ignores a call or decreases the ringtone volume, this can result in negative feedback to the decision engine. In the example of launching the social networking application mentioned above, the feedback can indicate whether the user actually decided to provide some device input to launch the social networking application within a predetermined amount of time after the application was launched, e.g., 30 seconds. If so, this can generally be considered "positive" feedback to the decision engine which reinforces the decision to take the action of launching the application shortly after the user calls the particular family member. Alternatively, if the user does not provide device input to launch the social networking application within the predetermined amount of time, this can be considered "negative" feedback to the decision engine that can cause the decision engine to decrease the probability to prelaunch the social networking application under these circumstances.

Note that, in this example, the application does not necessarily provide explicit feedback to the decision engine. Rather, the feedback is implicit, e.g., the application does not need to report that the user did or did not launch the application. Instead, this information can be provided by an operating system of the mobile device, where the decision engine is part of the operating system. In other cases, explicit feedback can be provided by an application, e.g., by a numerical or Boolean value that the application sends to the decision engine to indicate whether a specific action taken by the decision engine was appropriate. As one example of explicit application feedback, an application can inform the decision engine how long the application took to preload. Generally, relatively long preloading times for a given application suggest that the application is a good application to preload, and thus serve as positive feedback to the application launching decision engine. Conversely, relatively short preloading times suggest that preloading the application obtains relatively little benefit, and thus serve as negative feedback to the application launching decision engine.

Note that the application feedback mentioned above can be useful even when contextual values serve as very good or nearly perfect indicators of application usage patterns. For example, even if one or more contextors indicate a particular application will almost certainly be launched by the user in the near future, very little benefit can be obtained if loading the application normally happens so quickly that the user perceives no latency. Conversely, even if one or more contextors provide only a relatively uncertain indication that the user will launch a given application, it can still be worthwhile to prelaunch the application if the application takes a long time to become responsive to the user unless it is prelaunched.

EXAMPLE SCENARIO

FIG. 1 illustrates a scenario 100 in which context can be used to proactively perform device actions. Scenario 100 involves instances 1 and 2, each of which is discussed below. Starting at instance 1, example scenario 100 shows a mobile device 110 shortly, e.g., five seconds, after a user has requested to launch a particular application, e.g., the social networking application mentioned above. For example, the user may have provided some sort of device input (via keyboard, spoken command, trackball, touchscreen, etc.) that indicates the application should launch. However, the application may not yet be responsive to user commands because the application is doing some initialization processing, e.g., being loaded from storage into memory, being switched into an active application context (process or thread) by an operating system, trying to retrieve data over a network, etc.

As shown in FIG. 1, however, mobile device 110 can include a context-based action module 111 which can be configured to prelaunch the application to reduce the latency perceived by the user. Generally, context-based action module 111 can obtain context from the mobile device, e.g., one or more contextual values indicating that the mobile device was used to call "Bob" at instance 1. The contextual values can also indicate that the call was placed or received shortly, e.g., within two minutes, before receiving a user request to launch the social networking application. Over time, context-based action module 111 can learn that prelaunching the social networking application is an appropriate action to take for the user after the user has called or received a call from Bob. Thus, at instance 2, the context-based action module can launch the social networking application before the user actually requests the application. Therefore, the social networking application can be initialized and ready for use by the user the next time they call Bob. This is generally shown at instance 2 where the social networking application has already downloaded some pictures to the mobile device as part of the prelaunching.

EXAMPLE ARCHITECTURE

Figure 2:
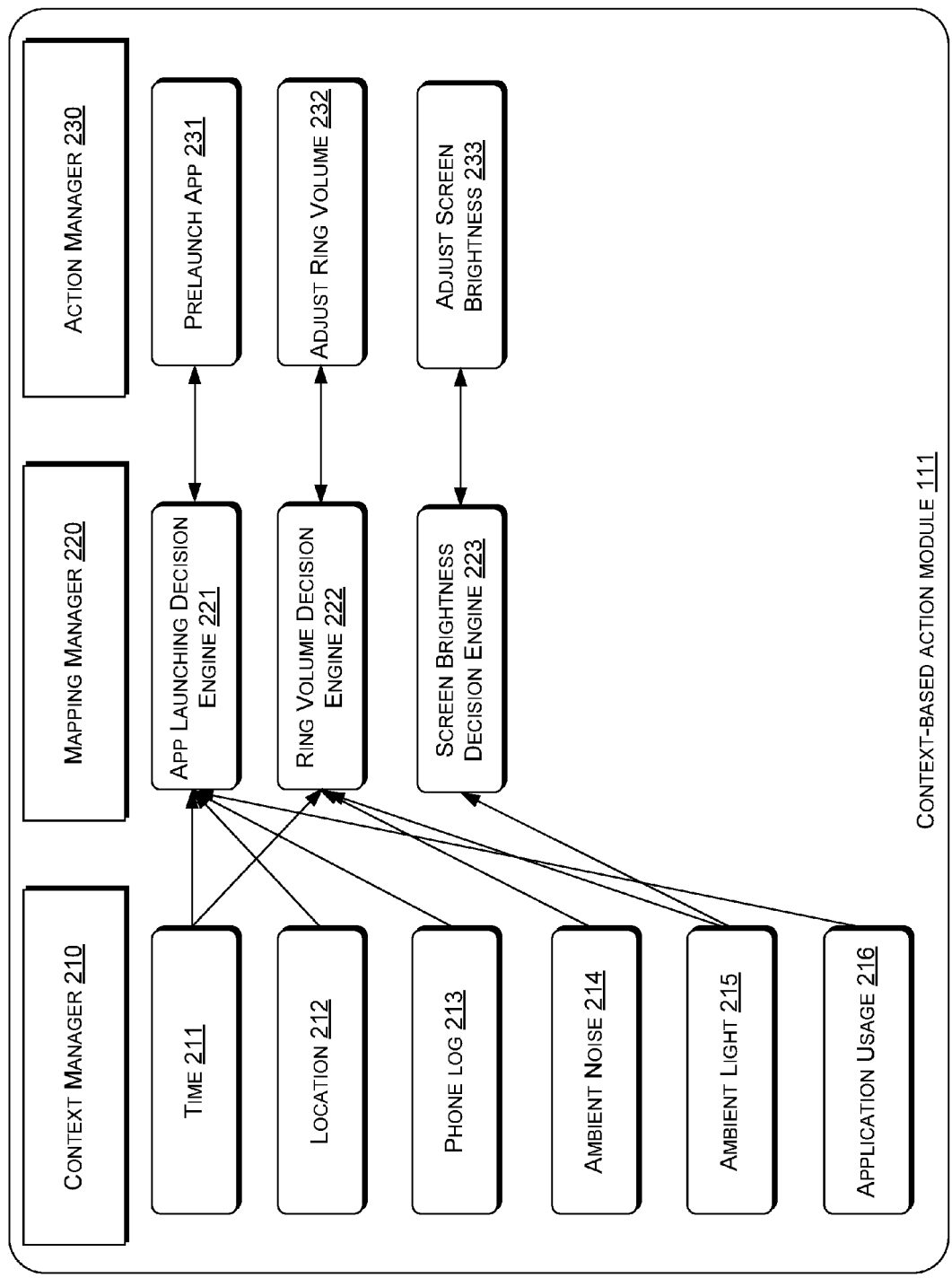
FIG. 2 shows an exemplary architecture of a module in accordance with some implementations of the present concepts.

FIG. 2 illustrates an exemplary architecture of context-based action module 111. As shown in FIG. 2, context-based action module 111 can include a context manager 210, a mapping manager 220, and an action manager 230. Generally speaking, context manager 210 can be configured to manage one or more contextors including time 211, location 212, phone log 213, ambient noise 214, ambient light 215, application usage 216, etc. Contextual values can be obtained from a local device clock and/or time server for time 211, from a GPS and/or cellular triangulation for location 212, from a call logging application for phone log 213, from a local device microphone for ambient noise 214, from a local device light sensor for ambient light 215, and from an operating system for application usage 216. Generally, individual contextual values can be obtained locally on the mobile device, e.g., from sensors, etc., and in some instances are stored in one or more local contextor logs. However, in some instances, contextor logs can be maintained and stored remotely, e.g., on a server, and retrieved by the mobile device for use by the context-based action module.

Other examples of contextors that are not shown in FIG. 2 are also contemplated. Generally, other contextors can be provided by various device sensors of mobile device 110 and/or other information maintained by the mobile device such as operating system logs, etc. As discussed in more detail below, contextors can be user-selectable, e.g., via a graphical user interface ("GUI") that allows a user to select which contextors are used by context manager 210.

Note also that developers can build new contextors usable by the decision engines to perform the actions. For example, consider a third-party application that installs an electronic compass on the mobile device. A corresponding contextor that provides values of the electronic compass, e.g., azimuth angles or logical directions (north, northwest, etc.) can be installed at this time. The existing decision engines can learn to take various actions using the newly-installed contextor without further modification, e.g., the new contextor "plugs in" to the existing framework provided by the context manager. This can be the case irrespective of whether the new contextor is provided by a manufacturer of the mobile device or developer of the mobile device operating system ("first party") or a third-party application developer.

Context-based action module 111 can also include a mapping manager 220, which can be configured to map contextual values provided by individual contextors to corresponding actions. Mapping manager 220 can include one or more decision engines configured to perform the mapping, e.g., application or "app" launching decision engine 221, ring volume decision engine 222, and/or screen brightness decision engine 223. Individual decision engines can be implemented using different decision algorithms, including probabilistic/statistical/stochastic models, online or offline learning via machine learning techniques, etc. Irrespective of the particular implementation of the decision engines, the decision algorithms implemented therein can determine whether to take particular actions. Generally, a history of previous device actions and contextual values can be used to train the decision engines over time so that the decision engines learn to refine the selection of various device actions in a way that is beneficial to the user. The previous device actions can be device actions that were previously taken by the decision engine, such as prelaunching an application, or instances where the user took a similar action such as launching the application directly via user input without prelaunching by the decision engine. As mentioned above for contextors, first or third-party developers can also provide new decision engines that plug directly into the mapping manager and can begin making decisions using existing contextors to perform the various actions. For example, a device can come from the manufacturer with a naive Bayesian decision engine, and a third-party developer can subsequently provide a time-windowed very fast decision tree decision engine that plugs into the mapping manager.

Action manager 230 can be configured to manage the various actions that can be taken by the decision engines of mapping manager 220. For example, the actions can include prelaunch app action 231, adjust ring volume action 232, and/or adjust screen brightness action 233. Generally speaking, each decision engine managed by the mapping manager can take one or more of the actions managed by the action manager. In some implementations, actions can also be user-selectable, e.g., via a graphical user interface ("GUI") that allows a user to select which actions are used by action manager 230. Like contextors and decision engines, actions can also be provided independently by first or third-party developers. For example, the electronic compass mentioned above can provide an action that causes the compass to illuminate. Over time, a decision engine may learn to illuminate the compass for the user at particular times, low ambient light, etc. More generally, new actions can be plugged into the action manager so that existing decision engines can learn to take the newly-available actions responsive to existing contextors.

In the following discussion, the prelaunch application action is described both generally and with respect to individual specific subactions (e.g., loading application code from memory, executing the code, etc.) that can each be considered part of the prelaunching action. Also, note that the term "prelaunch" is generally used herein to mean performing at least some launching of an application before the user has requested to execute the application. Thus, prelaunching performs at least some launching of the application to place the application into a prelaunched state (code/data already loaded into memory, code already executed, etc.) such that the application can be executed from the prelaunched state if a user subsequently requests to execute the application.

Note also that, in some implementations, individual decision engines can take multiple actions, e.g., each application that is prelaunched can be conceptualized as a different action. Similarly, adjusting ring volume can be thought of as a single action or as including several actions, e.g., separate actions for adjusting volume up or down. This is also true for adjusting screen brightness.

Whether an individual decision engine takes a particular action is a function of the value of the contextors that serve as the inputs to the decision engine. Over time, individual actions can provide positive or negative feedback whenever a decision engine takes these actions. This feedback can be used to update the decision engine to take actions that may be helpful to a user of the device, e.g., by automatically raising the ring tone volume and/or prelaunching applications for the user. Feedback from actions to the decision engines is generally illustrated in FIG. 2 via bidirectional arrows connecting the individual actions and decision engines.

Note also that the particular contextors, decision engines, and actions shown in FIG. 2 are exemplary, and other contextors, decision engines, and actions are contemplated. For example, as mentioned above, values of contextors can be populated from different sensors such as accelerometers, temperature sensors, electronic compasses or GPS, light sensors, microphone, camera, radio frequency identification (RFID) tag reading (using e.g. near-field communication), etc., as well as network availability and link quality. Contextors can also be populated from various applications and/or from an operating system of mobile device 110, e.g., the operating system may provide a device clock that is used for the time contextor. For example, mobile device 110 can include an operating system that tracks when different applications are launched, and launching of a particular application can serve as a contextor. Specifically, some applications may be "triggering" applications for prelaunching other applications, e.g., when a user has a tendency to request applications in a particular sequence. User behavior such as logging into a given application, keystroke sequences, etc. can also serve as contextors.

Note that the contextual values provided by a given contextor can be raw data or can be provided to the decision engines at a higher level. For example, raw GPS data can be converted into semantically richer logical locations by the location contextor, e.g., home, office, friend's house, etc. Similarly, raw clock data can be converted by the time contextor to morning, afternoon, evening, nighttime, etc.

Specific examples of suitable decision algorithms for the decision engines can include Bayesian (e.g., naive Bayes) classifiers, decision trees (e.g., very fast decision trees), support vector machines (SVM), hidden Markov models (HMM), Gaussian mixture models (GMM), etc. Consider a simple scenario where current time-of-day and logical location are used as contextors for a naive Bayesian decision engine. Whenever the decision engine observes an application running, the decision engine can increment an application counter $c\_x$ for the time of day when the observation is made. The decision engine can also increment another counter $c\_y$ which represents the logical location where the observation was made. The decision engine can also increment a counter Prior for the application, which represents the total number of times the application has been run. When the decision engine decides what application to run next, the decision engine can obtain values $c\_x'$ representing the current time of day and $c\_y'$ representing the current logical location. The decision engine can then assign a value of $c\_x'*c\_y'*$ Prior to each application, and run the application with the highest value.

Feedback occurs as follows: after the prediction is made, when the user actually launches an application, the decision engine can observe which application was launched. This information then gets recorded per the procedure above, e.g., using variables $c\_x$, $c\_y$, and Prior. Thus, if the user has previously tended to run a particular application at the same time of day and/or at the same location, this will tend to increase the assigned value and make it more likely the decision engine will run this application the next time the user is at the location and/or at the same time of day.

In one specific implementation, very fast decision trees are used because they have relatively low runtime overhead (CPU and memory utilization) and do not require offline training. Moreover, time-windowed implementations of these decision trees can also be used as these tend to adapt to changes in user behavior. More detail on very fast decision trees can be found in Domingos et al., "Mining High-Speed Data Streams," KDD '00, Proceedings of the sixth ACM SIGKDD international conference on Knowledge discovery and data mining (pp. 71-80), 2000. Boston, Mass.: ACM Press.

Generally speaking, previous values of contextors and action feedback can be used to update a decision engine. In turn, this can cause the Page of decision engine to take more appropriate actions as the decision engine learns based on the feedback. In some implementations, the contextual values and action feedback are "windowed" to discount older values. For example, windowed Bayesian algorithms or decision trees can use only relatively recent (e.g., the past week, month, 45 days, etc.) data for contextors and feedback to train the decision engine. This can help the decision engine to learn more quickly, e.g., in response to a sudden change in user behavior.

In the specific example of a decision tree, the decision engine can iteratively partition the contextual values into values or value ranges that map to particular actions. Each leaf node in the decision tree can represent an individual action, and the contextual values are represented as attributes that are used for the partitioning. Over time, leaf nodes (actions) can be replaced by test nodes that can then be split to learn new rules with the decision tree.

Also, note that the disclosed architecture allows for independence between the various actions and contextors. In one sense, the actions and contextors are "pluggable" into the architecture shown in FIG. 2. In other words, a new contextor can be added so the decision engine can learn using the new contextor whether to perform certain actions that are already enabled on the mobile device.

For example, an ambient light sensor that monitors ambient light at the location of the mobile device can be added as a contextor. If ambient light Page of tends to be correlated to certain device actions, a particular decision engine can learn that one or more existing actions can be initiated responsive to particular values for the ambient light. In other words, the decision engine can learn new rules for whether to perform existing device actions based on the new contextor.

One benefit of the independence between contextors and actions is illustrated by the following example, which shows how enabling a new contextor by context manager 210 can provide enhanced user satisfaction. Consider the user mentioned above that frequently opens the social networking application shortly after talking to their family member Bob. This user may also be in the habit of opening the social networking application every morning, immediately upon returning from a morning run that normally lasts for one hour. If only the phone calls contextor is enabled and all other contextors are not enabled, the application launching decision engine may learn to prelaunch the social networking app after the talks to Bob on the mobile device. However, because there is no time-sensitive contextor such as a time contextor or ambient light contextor, the decision engine does not have access to contextual values that are indicative of the user's tendency to open the social networking application in the morning.

Because the decision engine does not have an appropriate contextor to learn the user's habits in this example, the decision engine may not learn to prelaunch the social networking application for the user prior to their return from the morning run. By enabling a new time-sensitive contextor such as a current device time or an ambient light sensor (e.g., for a user who runs with their device), the existing application launching decision engine can learn to prelaunch the social networking application on the mobile device at an appropriate time in the morning. Positive feedback can reinforce this action, e.g., the positive feedback is received when the user actually requests to execute the social networking application each morning.

Note that the ambient light contextor and time contextor are not exactly aligned, e.g., their relationship changes abruptly after a switch to or from daylight savings time or over time as sunrise changes with the seasons. In some cases, the decision engine can learn to use one or the other contextor depending on the user's habits. Thus, the decision engine may learn to use the time contextor to prelaunch the social networking application for a user who habitually runs at the same time irrespective of when the sun rises. Conversely, the decision engine may learn to use the ambient light contextor to prelaunch the social networking application for a user who habitually runs at sunrise irrespective of the clock time.

As another example of how contextor/action independence can be beneficial, consider the following example of enabling a new action to work with an existing decision engine and existing contextors. Assume that a user that only has one action enabled—prelaunching the social networking application—and has an enabled contextor for device time and/or ambient light as mentioned above. The time change or ambient light change in the morning can serve as a contextual value that the decision engine uses to prelaunch the social networking application. However, the user may also tend to turn down their ring volume each evening and forget to turn the ring volume back up in the morning when they wake up. By enabling adjust ring volume action 232, the ring volume decision engine 222 can learn to raise the ring volume at a certain time in the morning or when ambient light increases in the morning. In this case, the feedback from raising the ring volume can be considered positive when either (1) the user answers a phone call or (2) does not reduce the ring volume after the adjustment. Note also that the ring volume decision engine could learn to turn down the ring volume at night at a particular time and/or when ambient light decreases.

In the previous examples, the use of the time contextor in conjunction with the ambient light contextor may be beneficial. The user may have a tendency to put the mobile device in their pocket during the day. In this instance, the lack of ambient light alone may not be an appropriate indication to decrease the ring volume because the user's pocket is dark during the day. By also using the time contextor, the ring volume decision engine can learn, for example, a rule to reduce the ring volume when both (1) the ambient light is relatively low and (2) the current time is relatively late, e.g., 8 pm.

EXAMPLE GUIS

FIGS. 3A and 3B illustrate exemplary graphical user interfaces ("GUIs") 300 and 350, respectively. GUI 300 can allow a user to selectively enable/disable one or more contextors, and GUI 350 can allow the user to selectively enable/disable one or more actions. For example, GUIS 300 and/or 350 can be presented on the mobile device to allow the user to select which contextors and/or actions are enabled on the mobile device. Generally speaking, by enabling a new contextor, the user can allow a decision engine to use contextual values provided by the new contextor when deciding whether to execute existing actions. Likewise, by enabling a new action, the user can allow the decision engine to determine whether to execute the new action based on contextual values provided by existing contextors.

With respect to FIG. 3A, the user can enable individual contextors using GUI 300 by selecting a corresponding block from enable column 301. When a given contextor is enabled by the user, the corresponding block is shown with an "x" and is otherwise shown empty. Thus, FIG. 3A illustrates a configuration where the user has enabled time 211 and location 212, while disabling phone log 213, ambient noise 214, ambient light 215, and application usage 216.

With respect to FIG. 3B, the user can enable individual actions using GUI 350 by selecting a corresponding block from enable column 351. When a given action is enabled by the user, the corresponding block is shown with an "x" and is otherwise shown empty. FIG. 3B illustrates an additional complexity whereby users can individually activate subactions for particular action. Here, the user has generally enabled the prelaunch application action 231, but has specifically disabled prelaunching of an email application, shown in FIG. 3B by the empty block corresponding to prelaunch email application 352. Thus, FIG. 3B illustrates a configuration where the user has enabled prelaunching of applications and adjusting of the ringtone. However, instead of enabling all applications to be prelaunched, the user has specifically prevented the email application from being prelaunched by the prelaunch application decision engine. More generally, for decision engines that implement multiple subactions, users can enable/disable specific subactions on a subaction-by-subaction basis as shown above.

EXAMPLE DECISION RULES

FIGS. 4A, 4B, and 4C illustrate a rules table 400, which is an exemplary data structure that is used to illustrate how various decision rules can change or be added over time. In this example, rules table 400 shows combined rules for several decision engines as they may evolve over time on the mobile device. As discussed in more detail below, rules table 400 illustrates decision rules that can be learned by app launching decision engine 221 and ring volume decision engine 222 as additional contextors and actions are enabled. Note, however, that rules table 400 is for exemplary purposes to show how enabling contextors and actions can result in new or updated decision rules, and does not necessarily reflect how the specific decision engines represent decision rules. Rather, the individual decision engines can represent the decision rules using the specific learning algorithms provided therein and thus the decision rules do not necessarily need to be tracked in a separate table. For example, a decision tree classifier may represent decision rules using a tree structure that can change over time, whereas a naive Bayesian classifier may represent decision rules using probabilistic values that can change over time.

FIG. 4A illustrates rules table 400 at a first time, e.g., when a user has enabled two actions—adjusting ring volume and prelaunching the social networking application, which as indicated above can be a subaction of the prelaunching application action. As mentioned above, the user may enable these actions using a GUI such as GUI 350. Furthermore, the user has enabled two contextors—the time and phone log contextors 211 and 213, respectively. Over time, the ring volume decision engine can learn to increase the ringtone volume at 8:00 AM every morning. In FIG. 4A, this is shown as rule 401, which maps the adjust ring volume action to the contextual value of 8:00 AM. Similarly, the app launching decision engine can learn to prelaunch the social networking application whenever the phone log contextor indicates the user has just had a telephone conversation with Bob. In FIG. 4A, this is shown as rule 402, which maps the phone log contextual value of "Bob" to the action of prelaunching the social networking application.

FIG. 4B illustrates rules table 400 at a second time, e.g., after the user has enabled an additional action to prelaunch an email application. As mentioned above, the user may do so using a GUI such as GUI 350. By enabling the new action, application launching decision engine 221 can learn over time that the user tends to launch their email application in the morning shortly after 9:00 AM. Thus, the prelaunch application decision engine can learn a new rule 403 that maps the prelaunch email application action to the contextual value of 9:00 AM.

FIG. 4C illustrates rules table 400 at a third time, e.g., after the user has enabled an additional contextor that measures ambient noise. For example, the ambient noise may be measured by a microphone on the user's mobile device. Because the user has enabled the new contextor, the adjust ring volume decision engine may refine rule 401 to depend on both the time and ambient noise contextors. Specifically, rule 401 is illustrated in FIG. 4C to show that the ringtone volume is only adjusted after 8:00 AM when the ambient noise is greater than 50 dB. As mentioned above, some implementations can continually refine the specific volume to which the ringtone is adjusted, how much ambient noise is present before the ringtone volume is adjusted, the specific times when the ringtone volume can be adjusted for ambient noise, etc.

To place the above example in context, the refinement to rule 401 shown in FIG. 4C may reflect a pattern of usage where the user had generally left the ring volume up when it was automatically increased by the decision engine, but had tended to turn the ring volume back down when the ambient noise was relatively low. Thus, under circumstances where the ambient noise was relatively low, the user provided implicit negative feedback to the decision engine that it was not appropriate to automatically increase the ring volume.

As further perspective to motivate the above discussion, the user may normally be at work by 8:00 AM in a relatively noisy office, but on their days off the background noise may be much less at their home. From the user's perspective, it may even appear that the mobile device has learned to raise the ring volume on days when the user is in the office. However, the user may later find that the mobile device also raises the ring volume if they are in a relatively noisy location other than work after 8:00 AM, e.g., a busy restaurant.

As mentioned above, however, location can also be used as a contextor. In the example provided above, location could also be a suitable contextor from which the ring volume decision engine could learn a rule similar to rule 401, e.g., by learning to increase the ring volume when the user is in their office and turn down the ring volume when the user is at home.

FIRST METHOD EXAMPLE

Figure 5:
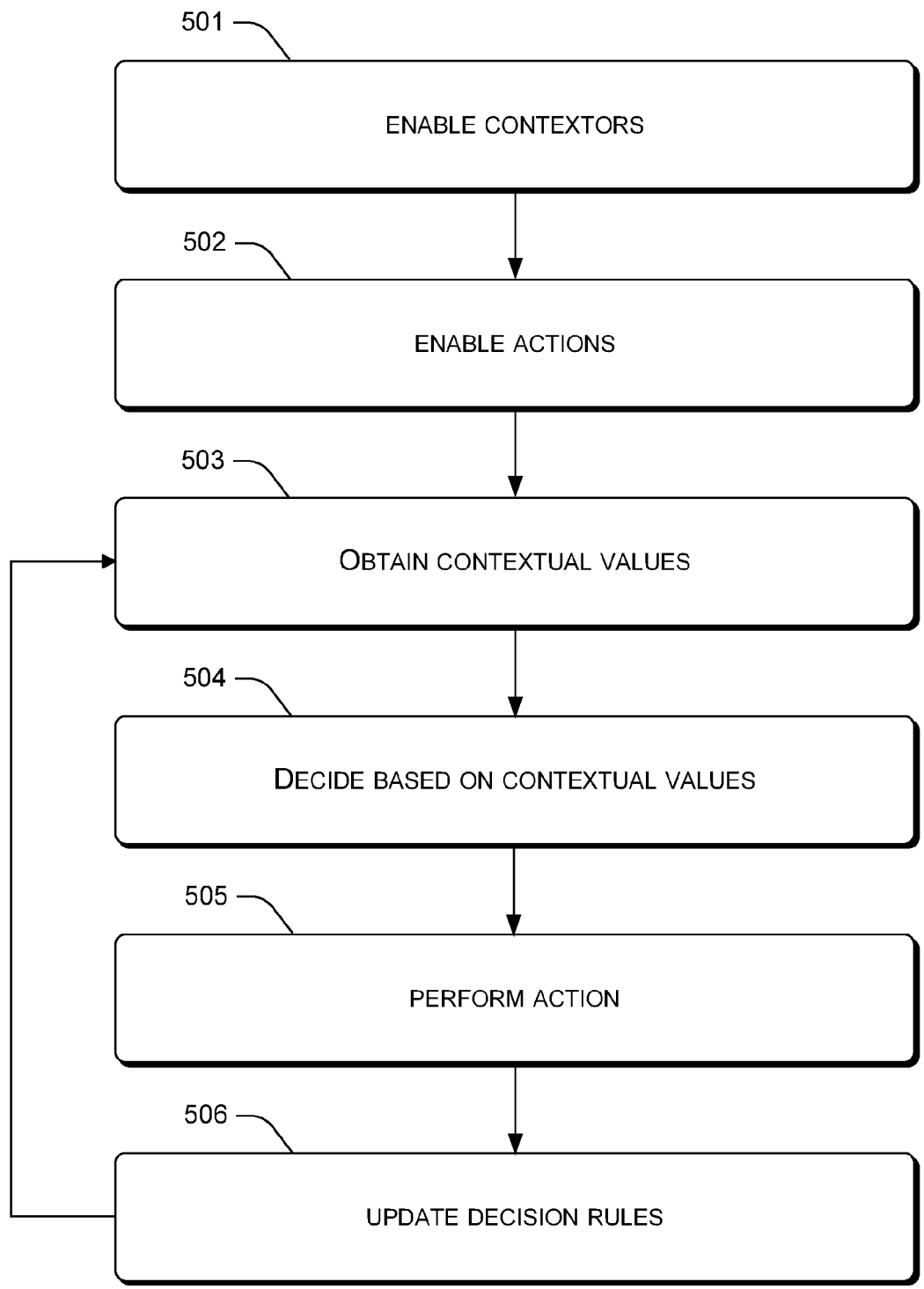
FIGS. 5 and 6 show flowcharts of exemplary methods in accordance with some implementations of the present concepts.

FIG. 5 illustrates an exemplary method 500 that can be used to implement context-based actions as discussed above. In some implementations, method 500 can be performed by context-based action module 111 of mobile device 110. However, as discussed more below, certain processing associated with method 500 can also be offloaded to one or more other devices, e.g., one or more servers.

At block 501, one or more contextors are enabled. For example, context manager 210 can be provided with one or more contextors that are preinstalled and enabled by a manufacturer of mobile device 110. In other implementations, contextors can be added later, e.g., by installing additional contextors via software or firmware updates, etc. In further implementations, context-based action module 111 is provided as aftermarket software that can be installed by the user. In further implementations, context manager 210 can allow users or software/firmware updates to install individual contextors on a contextor-by-contextor basis. Furthermore, as mentioned above, some implementations allow users to turn on and off (enable/disable) individual contextors as they see fit, e.g., using GUI 300.

Next, at block 502, one or more actions are enabled. As discussed above with respect to contextors, actions can be enabled at a time of manufacture, provided as part of a software/firmware update or installation, or installed individually on an action-by-action basis. Similarly, in some implementations, users can turn on and off (enable/disable) individual actions as they choose, e.g., using GUI 350.

Next, at block 503, one or more contextual values for each of the contextors are obtained. For example, values reflecting ambient light or sound can be obtained from one or more sensors, the current device time can be obtained, a phone log can be accessed, recent application behavior can be monitored by communicating with an operating system of the device, etc.

Next, at block 504, a decision is made based on the values of the contextors. For example, one or more decision engines can implement the decision algorithms mentioned above to map the values of the contextors to select one or more actions.

Next, at block 505, the selected action or actions is performed. For example, ring volume can be adjusted up or down, one or more applications can be prelaunched, etc.

Next, at block 506, action feedback is used to update the decision rules of the decision engine. For example, if the action includes launching an application, the feedback can be positive when the user requests to use the application within a predetermined amount of time after the launching, and negative otherwise. In the case of adjusting ring volume, the feedback can be considered positive when the user does not reverse the action within a predefined time period, or answers one or more phone calls without adjusting the ring volume within such a time period. If the user reverses the action by turning the ring volume back down/up, this can be considered negative feedback. Generally, positive feedback tends to reinforce individual actions so that the decision engine will continue to take the action when the contextors have the same or similar values as when the positive feedback was obtained. Likewise, negative feedback trains the decision engine not to take the action when the contextors have the same or similar values as when the negative feedback was obtained.

Note also that method 500 can be performed iteratively so as to continually refine the decision engine(s), as shown by the arrow from block 506 feeding back into block 503 in FIG. 5. Generally, blocks 503-506 can be performed iteratively over time based on more recent contextual values and more recent instances when various actions were performed. When a new contextor and/or new action is enabled, blocks 501 and 502 can serve as entry points to method 500, respectively. Also, because the decision engine is refined over time, a particular action may not be taken in some instances but may be taken in subsequent instances where the contextual value is the same. This is the case when the decision engine has learned over time to take the action for this particular contextual value. For example, in a first instance, the ring decision engine may not have learned rule 401, and thus may not adjust the ring volume at 8:00 AM. In a second, subsequent instance, the ring volume decision engine may adjust the ring volume at 8:00 AM after having learned rule 401. Likewise, the decision engine can continue to be refined and may eventually learn not to take certain actions for certain contextual values, e.g., as user behavior changes, etc.

SECOND METHOD EXAMPLE

Figure 6:
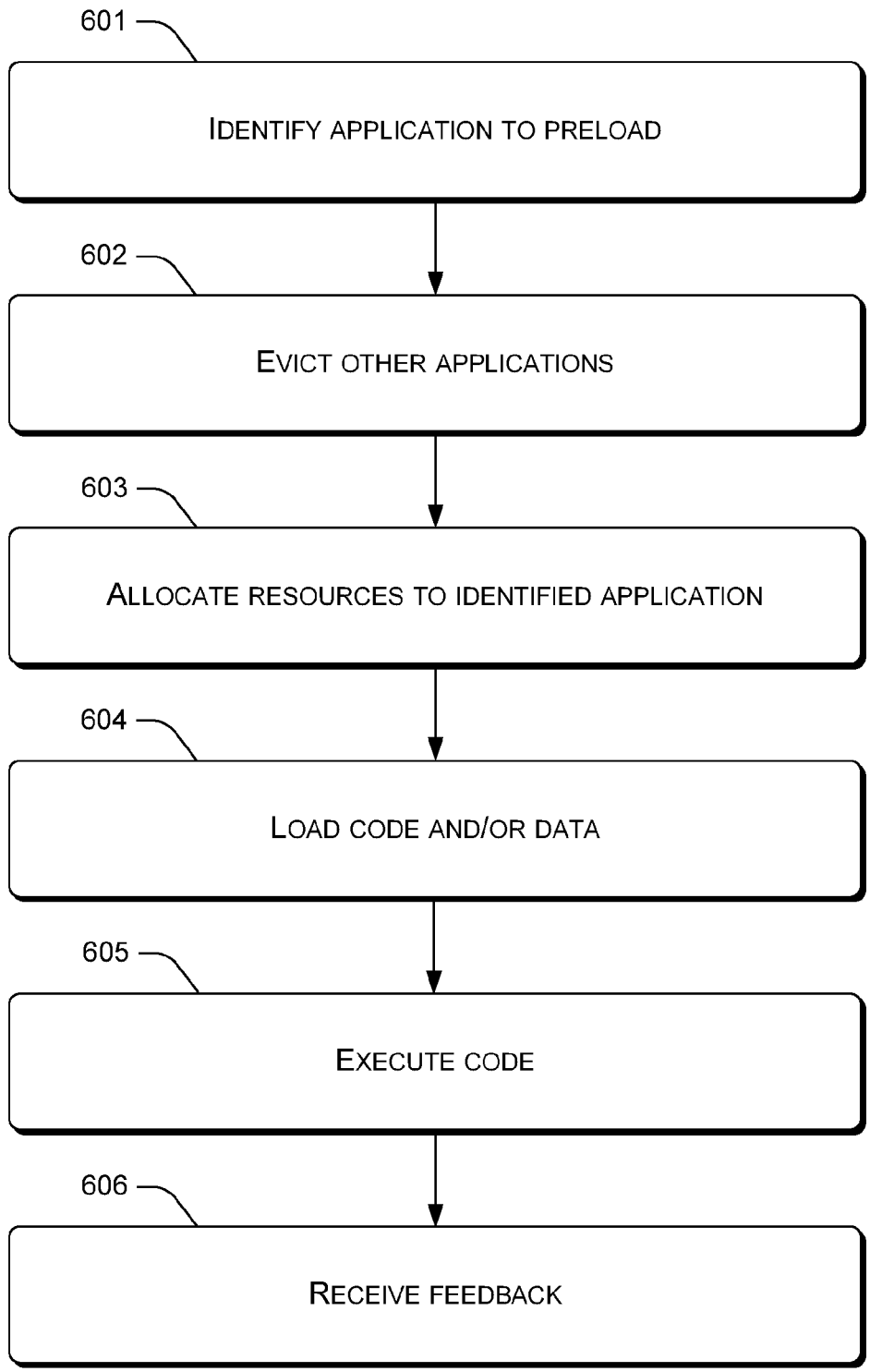

FIG. 6 illustrates an exemplary method 600 that can be used to implement context-based actions that prelaunch applications. Conceptually, method 600 can be viewed as a specific example of block 505 of method 500. In some implementations, method 600 can be performed by prelaunch application action 231 of mobile device 110.

At block 601, an application is identified for prelaunching. For example, the application can be identified by the application launching decision engine 221. In one example mentioned above, this decision was made to prelaunch the social networking application in an instance where the user has just completed a call with their family member Bob. Note that this example describes how this action is taken before the user of the mobile device has provided input requesting to execute the social networking application. Said differently, the decision is made because the decision engine anticipates that the user is likely to request the application relatively soon after the phone call.

In some implementations, the decision engine can also set one or more configuration parameters for the application at block 601. For example, a configuration parameter could be used to set different email signatures depending on who the user is emailing, e.g., "Bob" for some emails and "Bobby" for others. As another example, the social networking application could be configured for relatively high-bandwidth features when the user is at a geographical location (e.g., home) where there is Wi-fi and could be configured for relatively low-bandwidth features when the user is in a geographical location (e.g., in their car) where only cellular service is available.

Next, at block 602, one or more other applications can be evicted. For example, if the application being prelaunched needs a certain amount of processor and/or memory resources, one or more other applications can be shut down to free resources for the application being prelaunched. Specifically, processor resources such as threads or processes can be freed by shutting down the other applications, memory can be freed, and/or code or data for the other applications can be transferred from memory to storage. Various approaches can be used for determining which application to evict, e.g., the least-recently used application that is currently running, a randomly-selected application, predictive methods and/or cost-based approaches, etc. The application(s) that are evicted can employ "normal" shutdown behavior such as being moved to storage, deallocating memory and/or processor resources, etc.

In some implementations, the evicted application(s) can also be selected by a decision engine responsive to the values of one or more contextors, e.g., the decision engine can learn not only what application(s) to prelaunch, but also what application(s) to evict based on the values of the contextors. In such implementations, the application launching decision engine can also be configured to track contextual values indicating which applications have been evicted over time. Thus, the application launching decision engine can learn which applications are appropriate to evict given values of other contextors based on feedback from previous instances where various applications were evicted.

Next, blocks 603-605 can be performed. Generally, blocks 603-605 relate to prelaunching the application to place the application into a prelaunched state.

At block 603, resources can be allocated to the application being prelaunched. For example, the application can request memory resources from an operating system of the mobile device, and the memory resources can be allocated to the application. Similarly, processor resources, e.g., one or more threads or processes can be allocated to the application as part of block 603.

Next, at block 604, application code and/or data can be loaded into memory. For example, one or more application modules including executable binary code can be retrieved from storage (e.g., nonvolatile memory such as FLASH or a hard drive) and loaded into a relatively faster volatile memory, e.g., RAM. Various data used by the application can also be loaded from storage into memory, e.g., pictures, video, or other types of data files.

Next, at block 605, the loaded application code can execute on one or more processors of the mobile device. For example, the application code can perform various initialization steps such as downloading data (pictures, video, etc.) from a network, logging the user into a web service, etc. For game applications, block 605 can include downloading one or more scores, connecting to one or more peers or servers (e.g., multiuser games), etc.

Next, at block 606, action feedback can be received. In some implementations, applications can make an explicit call to provide feedback to the decision engine, e.g., a binary (Boolean) value indicating positive or minus feedback or more refined values (integer rating of 1-10, etc.). In other implementations, no explicit feedback from the application is used. Rather, the decision engine can monitor whether the prelaunched application is requested within a certain amount of time after being prelaunched. For example, the decision engine can consider use of the application within a predetermined amount of time (e.g., two minutes) of prelaunching as positive feedback and consider the feedback to be negative otherwise.

Note that method 600 may be performed without modification to the code of the application that is being prelaunched. For example, the output of the application launching decision engine can be fed into a scheduler of an operating system of the mobile device. The scheduler can simply execute the prelaunched application and allow the application to run for a predetermined amount of time, e.g., 15 seconds. During this time, the application code can simply execute normally to perform any initialization steps that would otherwise be performed after the user explicitly launches the application. After the expiration of the predetermined amount of time, the operating system scheduler can prevent the application from further execution until the user explicitly requests to execute the application. For example, the operating system can allow the application (including fetched data) to continue residing in memory without being evicted, but stop scheduling the application on the processor until the user request is actually received. In many cases, this approach requires no changes to the application code and can be implemented by folding in the decisions of the decision engine without further modifications to the application or operating system scheduler.

In other implementations, application code can provide an explicit call or "sync action" that is used for prelaunching purposes. In such implementations, the application designers can decide what functionality is appropriate for the application to execute when being prelaunched. In such implementations, the application is "aware" that the application is being prelaunched because the sync action is called instead of "normal" startup procedures. This implementation allows application designers to segregate certain initialization functionality that is appropriate for prelaunching purposes into the sync action. Thus, by providing the sync action, the application designers can control what application functionality is performed during the prelaunching stage and what application functionality is deferred until the user explicitly requests to execute the application.

ADDITIONAL EXAMPLES

The contextors, actions, and decision engines discussed above are exemplary and are provided to show concrete examples of how the disclosed concepts can be implemented. However, many additional use cases are contemplated that are also consistent with the disclosed implementations. Generally speaking, additional functionality can be provided by enabling different types of contextors, actions, and decision engines.

For example, contextors can be provided that relate to specific user behaviors, emotions, activities, etc. In some implementations, users can explicitly indicate their mood by indicating whether they are happy, angry, sad, etc. In other cases, the user's mood may be inferred, e.g., from tone of voice, words used in email communications, etc. (additional details on mood research can be found at http://affect.media.mit.edu/publications.php). If such a mood contextor indicates the user is sad, for example, the ring volume decision engine may learn to turn off the phone ringer because the user does not take telephone calls when they are sad. As another example, the application launching decision engine can learn to launch the social networking application when the user indicates they are happy, e.g., because the user tends to participate in social networking activities when they are in a relatively good mood.

As mentioned above, the user's location can also be used as a contextor. In some implementations, different logical locations can be defined that are associated with physical locations (e.g., GPS coordinates). By defining logical locations, learned functionality can stay consistent even if the user changes jobs, moves to a new home, etc. For example, if the user changes job and begins commuting to a new physical workplace, the user can define the new physical location as the logical location for "work." Thus, any rules that were previously learned with respect to the user's old workplace can stay in place because they are associated with the logical location of "work" instead of with the specific physical locations of the different workplaces.

As another example of a logical location, the general concept of "at an eating/drinking establishment" can be used as a logical location whenever the user's GPS coordinates indicate they are at such a facility. Thus, if the user is in the habit of texting frequently whenever they are at any type of restaurant, cafe, coffee house, etc., the application launching decision engine can learn to open a text messaging application. Thus, the logical location "at an eating/drinking establishment" can be associated with multiple locations and indeed even locations that the user has not previously visited with the mobile device. Accordingly, the mobile device can take an appropriate action such as launching the messaging application based on the type of venue the user is located at, even if the user has not previously taken that action at that specific venue. Rather, the action can be inferred by the decision engine based on the user's previous actions at similar venues.

Another example of contextors can relate to different types of movement. For example, the user may have different habits when they are walking vs. driving. As a specific example, the user may tend to use voice recognition software to prepare emails and/or text messages when driving, but may tend to use a keyboard to prepare emails and/or text messages when walking. Some implementations may determine whether the user is walking or driving based on their recent movement, e.g., relative velocity, etc. Thus, a movement contextor can provide contextual values such as "walking," "driving," "bicycling," "stationary," etc. In still further implementations, the movement contextor can use an accelerometer to determine if the user is dancing or doing other in-place activities.

As another example, contextors can relate to individuals that are in the proximity of the mobile device. For example, if the user is with particular friends, particular family members, etc. the user may tend to use their mobile device differently. In some implementations, the user may need to explicitly identify who they are with, but in other implementations this can be determined by the mobile device automatically, e.g., by recognizing the mobile devices of the other individuals via Bluetooth, etc. Consider a user that may tend not to take any telephone calls when they are with their children, but may always answer their phone when they are with a specific friend. In such implementations, the ring volume decision engine can learn to turn down the ring volume when the user is with their children, but not to do so when the user is with this specific friend.

As also mentioned above, contextors can reflect information provided by one or more applications on the mobile device. For example, an email application may provide a contextual value indicating that the user has activated an out-of-office message, or that the user has a calendar appointment indicating the user is currently in a business meeting. As yet another example, a contextor may indicate that the user has recently sent an email to a particular person, whether a certain word was in the subject and/or body of the email, etc. For example, if a user receives an email with the string "http:// . . ." the decision engine may launch a browser application, e.g., after having learned this action based on previous instances where the user clicked on hyperlinks in emails thus causing the browser application to launch.

In some implementations, contextors can be logged by the mobile device into time "chunks," e.g., hourly, minute-by-minute, 15-minute blocks, etc., and the contextual values can be in a contextor log in entries for each time chunk. The individual decision engines can update the algorithms for each time chunk. In some implementations, the relative frequency with which the decision engine(s) update and/or the size of the corresponding time chunks can be user-configurable.

The various actions mentioned above (prelaunching applications, adjusting ring volume, adjusting screen brightness, etc.) are also exemplary, and other types of actions are also contemplated. In some implementations, the mobile device can be turned on or off automatically, put into airplane mode, etc. In further implementations, individual decision engines can learn device actions in an exploratory fashion. For example, a decision engine can try a new action, such as illuminating the electronic compass for the user, even if the user has never illuminated the compass before. In such implementations, this can help the user learn about certain features of their mobile device that they may not have even known about.

As another example, some implementations can throttle background services as a particular action. This can have the effect of freeing up computational resources (processor cycles and/or memory) for other applications the user may wish to execute. A background throttling decision engine may learn to throttle the background services when various contextual values indicate the user is likely to be using resource-intensive applications, e.g., when the user is at work, at a particular time of day, after receiving an email with a particular type of file extension, etc.

SYSTEM EXAMPLE

Figure 7:
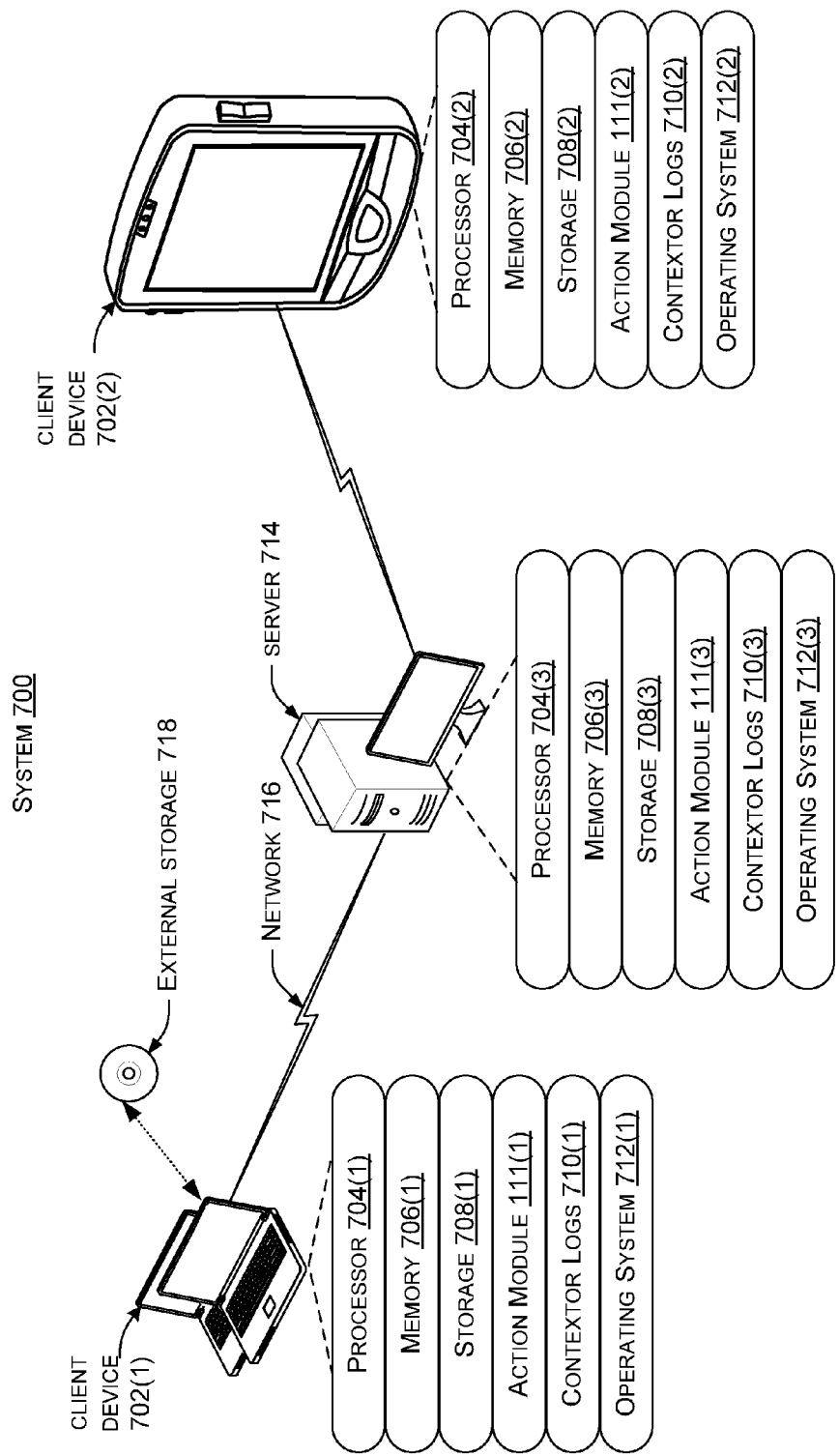
FIG. 7 shows an example of a system in accordance with some implementations of the present concepts.

FIG. 7 shows an example of a system 700. Example system 700 includes one or more client device(s) 702, shown as a notebook client device 702(1) and a mobile client device 702(2), respectively. In this case, client device(s) 702 can each include a processor 704, memory 706, storage 708, context-based action module 111, contextor logs 710, and operating system 712. (A suffix '(1)' is utilized to indicate an occurrence of these modules on client device 702(1) and a suffix '(2)' is utilized to indicate an occurrence on client device 702(2)). Context-based action module 111 can generally be configured to perform the processing discussed above with respect to FIGS. 1-6. Contextor logs 710 can include various contextual values that are stored over time for enabled contextors, as well as an indication of particular actions that were taken at the times when the actions were taken by the user or a decision engine.

System 700 can also include one or more server(s) 714. Server(s) 714 can be a computing device that also includes a processor 704(3), memory 706(3), and storage 708(3). Note the suffix (3) is used to indicate an occurrence of a processor or storage on server 714. Server 714 can also include context-based action module 111(3), and certain processing discussed above with respect to FIGS. 1-6 can also be performed by context-based action module 111(3) on server(s) 714. In one specific implementation, one or more decision engines are implemented by context-based action module 111(3) on server(s) 714, while the actions themselves are taken on the individual client devices. Viewed from one perspective, this implementation can distribute the context manager 210 and action manager 230 on the client devices and the mapping manager 220 on the server.

Client device(s) 702 and server 714 can communicate over one or more networks 716, such as, but not limited to, the Internet. Context-based action modules 111 can be implemented as software, hardware, and/or firmware. Processor(s) 704 can execute data in the form of computer-readable instructions to provide a functionality. Data and/or computer-readable instructions can be stored on memory 706 and/or storage 708. The memory and storage can include any one or more of volatile or non-volatile memory, hard drives, and/or optical storage devices (e.g., CDs, DVDs etc.), among others.

In some implementations, memory 706 is a volatile memory with relatively low latency, whereas storage 708 is a non-volatile memory used for long-term storage of instructions (code) and data. In such implementations, storage 708 is used to retain changes to code and/or data when a computing device is power cycled and the changes are lost from volatile memory. In such implementations, prelaunching an application can include retrieving some or all application code and/or data from storage 708 and loading the retrieved application code or data into memory 706, as discussed above with respect to block 604 of method 600. By doing so before a user requests to execute a particular application, the application can appear more responsive to the user than would be the case if the application code and/or data needed to be retrieved from storage after the user requests to execute the application. In some cases, memory 706 can be substantially (e.g., one or more orders of magnitude) "faster" or lower-latency for reads and/or writes than storage 708.

Also, note that context-based action module 111 can interact with, or be part of, operating system 712. In some implementations, operating system 712 provides scheduler functionality that schedules individual applications to execute on processor 704. In some implementations, an operating system scheduler allocates processor resources such as threads and/or processes to scheduled applications, e.g., at block 603 of method 600.

Client device(s) 702 and server 714 can also be configured to receive and/or generate data in the form of computer-readable instructions from an external storage 718. Examples of external storage 718 can include optical storage devices (e.g., CDs, DVDs etc.), hard drives, and flash storage devices (e.g., memory sticks or memory cards), among others. In some cases, modules discussed herein can be installed on the client devices or server during assembly or at least prior to delivery to the user. In other scenarios, the modules discussed herein can be installed by the user after delivery, such as a download available over network 716 and/or from external storage 718. The modules discussed herein can be manifest as freestanding applications, application parts and/or part of the computing device's operating system.

Collectively, the modules discussed herein can achieve the functionality described above relative to FIGS. 1-6. Specifically, context-based action module 111 can be configured to perform methods 500 and/or 600. It is worth noting that in some instances, the client devices or servers can comprise multiple computing devices or machines, such as in a distributed environment. In such a configuration, methods 500 and/ or 600 can be implemented using distributed processing across the multiple computing devices or machines.

As mentioned above, some implementations provide for the various decision engines to be executed on server 714. In such implementations, each client device can maintain local contextor logs 710(1) and 710(2), respectively, which include histories of contextual values for individual contextors on the respective client devices as well as actions taken on the devices. These contextor logs can be uploaded to server 714, and can be combined as contextor logs 710(3).

In such implementations, the decision engines on the server can perform learning on contextor logs for multiple users. This can be particularly useful in instances where contextor data for individual users is relative sparse. In such implementations, an individual decision engine can learn rules that may be applicable to multiple users. One example is the email-embedded hyperlink example set forth above, e.g., it is likely that many different users will request a browser application shortly after receiving an email with the string "http:// . . . " somewhere in the email. More generally, each decision engine can be configured to mine contextor logs and actions performed on other devices for other users. Thus, the decision engine can learn from the context-action relationships of other users to improve the user's experience. In some implementations, the decision engine may even be seeded, initialized, or otherwise modified using values obtained from decision engines on other user's devices. Note, however, that all of the processing mentioned herein (including training decision engines) can instead be performed locally on an individual client device and the decision engines can be trained only on contextor logs that are specific to that client device or user.

The terms "computer," "client device," "server" and "computing device" as used herein can mean any type of device that has some amount of processing capability and/or storage capability. Generally, a "mobile device" refers to a computing device embodied in a form factor suitable for a user to carry on their person. Processing capability can be provided by one or more processors that can execute data in the form of computer-readable instructions to provide a functionality.

As mentioned above, computer-readable instructions can be stored on storage and/or memory devices. The storage and/or memory devices can be internal and/or external to the computing device. The storage and/or memory devices can include any one or more of volatile or non-volatile memory, hard drives, flash storage devices, and/or optical storage devices (e.g., CDs, DVDs etc.), among others. As used herein, the term "computer-readable media" can include transitory and non-transitory computer-readable instructions. In contrast, the term "computer-readable storage media" excludes transitory instances. Computer-readable storage media includes "computer-readable storage devices." Examples of computer-readable storage devices include volatile storage media, such as RAM, and non-volatile storage media, such as hard drives, optical discs, and flash memory, among others.

Examples of computing devices can include traditional computing devices, such as personal computers, cell phones, smart phones, personal digital assistants, or any of a myriad of ever-evolving or yet to be developed types of computing devices. Further, aspects of system 700 can be manifest on a single computing device or distributed over multiple computing devices.

Conclusion

The order in which the example methods are described is not intended to be construed as a limitation, and any number of the described blocks or steps can be combined in any order to implement the methods, or alternate methods. Furthermore, the methods can be implemented in any suitable hardware, software, firmware, or combination thereof, such that a computing device can implement the methods. In one case, the methods are stored on one or more computer-readable storage media as a set of instructions such that execution by one or more computing devices causes the one or more computing devices to perform the method.

Although techniques, methods, devices, systems, etc. discussed herein are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method comprising:
obtaining one or more historical contextual values from one or more contextors; the one or more historical contextual values corresponding to historical instances where a device action was previously initiated by a particular user input provided to a mobile computing device;
training a decision engine to learn a decision rule to automatically perform the device action on the mobile computing device, the decision engine being trained using one or more historical contextual values corresponding to the historical instances where the user provided the particular input to the mobile computing device that initiated the device action;
evaluating one or more current contextual values using the decision rule and determining that the one or more current contextual values trigger the device action; and
in response to the device action being triggered by the one or more current contextual values and in the absence of the particular user input, causing the mobile computing device to automatically perform the device action that was previously initiated by the particular user input.

2. The method according to claim 1, wherein an individual historical contextual value and an individual current contextual value are both obtained from a physical sensor on the computing device.

3. The method according to claim 1, wherein an individual historical contextual value reflects activity by a user of the mobile computing device or activity of other users on other mobile computing devices.

4. The method according to claim 3, the activity comprising the user executing an application on the mobile computing device.

5. The method according to claim 3, the activity comprising the user communicating with another user using the mobile computing device.

6. The method according to claim 1, wherein an individual current contextual value reflects a current time or current location of the mobile computing device.

7. The method according to claim 1, further comprising enabling the action while leaving at least one other action disabled responsive to user interaction with graphical user interface displayed on the mobile computing device.

8. The method according to claim 1, further comprising enabling an individual contextor while leaving another individual contextor disabled responsive to user interaction with a graphical user interface displayed on the mobile computing device.

9. A mobile computing device comprising:
one or more hardware processors; and
hardware storage storing computer-readable instructions which, when executed by the one or more hardware processors, cause the mobile computing device to:
obtain one or more current contextual values from one or more contextors on the mobile computing device;
provide the one or more current contextual values to a decision engine trained to learn a decision rule that causes the mobile computing device to automatically perform a device action, the decision engine being trained using one or more historical contextual values corresponding to previous instances where explicit user input initiated the device action on the mobile computing device or other mobile computing devices; and
in response to the decision rule being satisfied by the one or more current contextual values and in the absence of the explicit user input, automatically perform the device action on the mobile computing device.

10. The mobile computing device of claim 9, wherein the computer-readable instructions further cause the mobile computing device to:
train the decision engine using feedback indicating whether the user provided the explicit user input after the device action was automatically performed.

11. The mobile computing device of claim 9, wherein the computer-readable instructions further cause the mobile computing device to:
obtain the trained decision engine from a server.

12. The mobile computing device of claim 11, wherein the computer-readable instructions further cause the mobile computing device to:
provide feedback to the server indicating whether the user provided the explicit user input after the device action was automatically performed.

13. The mobile computing device of claim 12, wherein the computer-readable instructions further cause the mobile computing device to:
provide the one or more current contextual values to the server.

14. The mobile computing device of claim 9, wherein the device action comprises launching or prelaunching of an application and the explicit user input is a user selection of the application.

15. The mobile computing device of claim 14, wherein the one or more historical contextual values indicate times and locations when the application was previously launched or prelaunched on the mobile computing device or the other mobile computing devices.

* * * * *